US008795086B2

(12) United States Patent
Rudi et al.

(10) Patent No.: US 8,795,086 B2
(45) Date of Patent: Aug. 5, 2014

(54) REFEREE MODE WITHIN GAMING ENVIRONMENTS

(75) Inventors: Scott Rudi, Aliso Viejo, CA (US); Matt DeWald, Laguna Niguel, CA (US); Morgan Romine, San Diego, CA (US)

(73) Assignee: Red 5 Studios, Inc., Laguna Hills, CA (US)

( * ) Notice: Subject to any disclaimer, the term of this patent is extended or adjusted under 35 U.S.C. 154(b) by 0 days.

(21) Appl. No.: 13/555,049

(22) Filed: Jul. 20, 2012

(65) Prior Publication Data

US 2014/0024463 A1    Jan. 23, 2014

(51) Int. Cl.
*G06F 17/00* (2006.01)

(52) U.S. Cl.
USPC .................................. 463/42; 463/4; 463/43

(58) Field of Classification Search
USPC ................................................. 463/42, 4, 43
See application file for complete search history.

(56) References Cited

U.S. PATENT DOCUMENTS

| | | | |
|---|---|---|---|
| 5,371,852 A | 12/1994 | Attanasio et al. |
| 5,384,910 A | 1/1995 | Torres |
| 5,943,052 A | 8/1999 | Allen et al. |
| 6,067,545 A | 5/2000 | Wolff |
| 6,330,605 B1 | 12/2001 | Christensen et al. |
| 6,374,336 B1 | 4/2002 | Peters et al. |
| 6,380,933 B1 | 4/2002 | Sharir et al. |
| 6,434,398 B1 | 8/2002 | Inselberg |
| 6,456,304 B1 | 9/2002 | Angiulo et al. |
| 6,466,275 B1 | 10/2002 | Honey et al. |
| 6,526,448 B1 | 2/2003 | Blewett |
| 6,561,811 B2 | 5/2003 | Rapoza et al. |
| 6,571,216 B1 | 5/2003 | Garg et al. |
| 6,597,375 B1 | 7/2003 | Yawitz |
| 6,629,129 B1 | 9/2003 | Bookspan et al. |
| 6,699,127 B1 | 3/2004 | Lobb et al. |
| 6,760,042 B2 | 7/2004 | Zetts |
| 6,760,595 B2 | 7/2004 | Inselberg |
| 6,772,195 B1 | 8/2004 | Hatlelid et al. |
| 6,864,886 B1 | 3/2005 | Cavallaro et al. |

(Continued)

FOREIGN PATENT DOCUMENTS

| | | |
|---|---|---|
| CN | 102385479 | 3/2012 |
| CN | 102681839 | 9/2012 |

(Continued)

OTHER PUBLICATIONS

Apr./May 2011 Admin Reqruitment Application—Europe. i3d.net. Online. Apr. 24, 2011. Accessed via the Internet. Accessed Nov. 8, 2012.<URL: http://forum.i3d.net/battlefield-heroes-ranked-community-servers/170034-apr-may-2011-admin-regruitment-application-europe.html#post1270013>.*

(Continued)

*Primary Examiner* — Dmitry Suhol
*Assistant Examiner* — Carl V Larsen
(74) *Attorney, Agent, or Firm* — Carr & Ferrell LLP

(57) ABSTRACT

Systems and methods for providing referee control over game play within a gaming environment are provided herein. Exemplary methods may include establishing a referee role that allows an end user to exert referee control of game play relative to a competition, within a gaming environment, between a plurality of participants, establishing referee rights for the referee role, the referee rights being made available only to the end user upon which the referee role has been conferred; and, conferring the referee role upon the end user.

19 Claims, 4 Drawing Sheets

(56) References Cited

U.S. PATENT DOCUMENTS

| | | |
|---|---|---|
| 6,928,485 B1 | 8/2005 | Krishnamurthy et al. |
| 6,996,413 B2 | 2/2006 | Inselberg |
| 6,999,083 B2 | 2/2006 | Wong et al. |
| 7,075,556 B1 | 7/2006 | Meier et al. |
| 7,133,051 B2 | 11/2006 | Sloo et al. |
| 7,219,160 B1 | 5/2007 | Buchsbaum et al. |
| 7,350,158 B2 | 3/2008 | Yamaguchi et al. |
| 7,390,254 B2 | 6/2008 | Hirai |
| 7,458,894 B2 | 12/2008 | Danieli et al. |
| 7,490,314 B2 | 2/2009 | Yuknewicz et al. |
| 7,492,363 B2 | 2/2009 | Meier et al. |
| 7,506,318 B1 | 3/2009 | Lindo et al. |
| 7,509,390 B1 | 3/2009 | Raman et al. |
| 7,632,186 B2 | 12/2009 | Spanton et al. |
| 7,719,971 B1 | 5/2010 | Issa |
| 7,729,992 B2 | 6/2010 | Rose |
| 7,824,268 B2 | 11/2010 | Harvey et al. |
| 7,827,560 B2 | 11/2010 | Bayer |
| 7,844,301 B2 | 11/2010 | Lee et al. |
| 7,890,701 B2 | 2/2011 | Lowery et al. |
| 7,917,632 B2 | 3/2011 | Lee et al. |
| 7,970,820 B1 | 6/2011 | Sivasubramanian et al. |
| 8,001,063 B2 | 8/2011 | Tesauro et al. |
| 8,025,569 B2 | 9/2011 | Nguyen et al. |
| 8,025,572 B2 | 9/2011 | Spanton et al. |
| 8,128,469 B2 | 3/2012 | Hormigo Cebolla et al. |
| 8,128,503 B1 | 3/2012 | Haot et al. |
| 8,130,747 B2 | 3/2012 | Li et al. |
| 8,235,817 B2 | 8/2012 | Zalewski |
| 8,475,284 B1 | 7/2013 | Rudi et al. |
| 8,478,767 B2 | 7/2013 | Kern et al. |
| 8,572,180 B2 | 10/2013 | Kern et al. |
| 8,589,423 B2 | 11/2013 | Kern et al. |
| 8,628,424 B1 | 1/2014 | Kern et al. |
| 2001/0036356 A1 | 11/2001 | Weaver et al. |
| 2001/0055991 A1 | 12/2001 | Hightower |
| 2002/0002074 A1 | 1/2002 | White et al. |
| 2002/0032056 A1 | 3/2002 | Oh |
| 2002/0097984 A1 | 7/2002 | Abecassis |
| 2002/0183115 A1 | 12/2002 | Takahashi et al. |
| 2002/0198769 A1 | 12/2002 | Ratcliff, III |
| 2003/0038805 A1 | 2/2003 | Wong et al. |
| 2003/0084462 A1 | 5/2003 | Kubota et al. |
| 2003/0220143 A1 | 11/2003 | Shteyn et al. |
| 2004/0087363 A1 | 5/2004 | Bogenn |
| 2004/0116183 A1 | 6/2004 | Prindle |
| 2004/0153569 A1 | 8/2004 | Savathphoune |
| 2004/0192354 A1 | 9/2004 | Sawano |
| 2004/0248631 A1 | 12/2004 | Hirai |
| 2004/0259627 A1 | 12/2004 | Walker et al. |
| 2005/0020359 A1 | 1/2005 | Ackley et al. |
| 2005/0071736 A1 | 3/2005 | Schneider et al. |
| 2005/0091597 A1 | 4/2005 | Ackley |
| 2005/0227771 A1 | 10/2005 | Nelson et al. |
| 2006/0058103 A1 | 3/2006 | Danieli et al. |
| 2006/0098013 A1 | 5/2006 | Wong et al. |
| 2006/0170778 A1 | 8/2006 | Ely et al. |
| 2006/0179147 A1 | 8/2006 | Tran et al. |
| 2006/0206565 A1 | 9/2006 | Ganesan et al. |
| 2006/0258446 A1 | 11/2006 | Nguyen et al. |
| 2007/0055694 A1* | 3/2007 | Ruge et al. ................. 707/104.1 |
| 2007/0063995 A1 | 3/2007 | Bailey et al. |
| 2007/0117617 A1 | 5/2007 | Spanton et al. |
| 2007/0117635 A1 | 5/2007 | Spanton et al. |
| 2007/0250901 A1 | 10/2007 | McIntire et al. |
| 2007/0256030 A1 | 11/2007 | Bedingfield |
| 2007/0298878 A1 | 12/2007 | Short |
| 2008/0026839 A1 | 1/2008 | Alringer |
| 2008/0052384 A1 | 2/2008 | Marl et al. |
| 2008/0071907 A1 | 3/2008 | Thompson |
| 2008/0119286 A1 | 5/2008 | Brunstetter et al. |
| 2008/0125226 A1 | 5/2008 | Emmerson |
| 2008/0126357 A1 | 5/2008 | Casanova et al. |
| 2008/0146339 A1* | 6/2008 | Olsen et al. ................. 463/42 |
| 2008/0146342 A1 | 6/2008 | Harvey et al. |
| 2008/0196098 A1 | 8/2008 | Cottrell et al. |
| 2009/0005196 A1* | 1/2009 | Kessler et al. ................. 473/476 |
| 2009/0017750 A1 | 1/2009 | Marcinkiewicz |
| 2009/0031227 A1 | 1/2009 | Chakrabarti et al. |
| 2009/0044113 A1 | 2/2009 | Jones et al. |
| 2009/0083662 A1 | 3/2009 | Fitzmaurice et al. |
| 2009/0083665 A1 | 3/2009 | Anttila et al. |
| 2009/0100366 A1 | 4/2009 | Fitzmaurice et al. |
| 2009/0118017 A1 | 5/2009 | Perlman et al. |
| 2009/0118018 A1 | 5/2009 | Perlman et al. |
| 2009/0118019 A1 | 5/2009 | Perlman et al. |
| 2009/0118020 A1 | 5/2009 | Koivisto et al. |
| 2009/0124387 A1 | 5/2009 | Perlman et al. |
| 2009/0144380 A1 | 6/2009 | Kallman et al. |
| 2009/0172171 A1 | 7/2009 | Amir |
| 2009/0208181 A1 | 8/2009 | Cottrell |
| 2009/0215531 A1 | 8/2009 | Perlman et al. |
| 2009/0215540 A1 | 8/2009 | Perlman et al. |
| 2009/0249189 A1 | 10/2009 | Jania et al. |
| 2009/0254998 A1 | 10/2009 | Wilson |
| 2009/0265473 A1 | 10/2009 | Hydrie et al. |
| 2009/0290753 A1 | 11/2009 | Liu et al. |
| 2009/0297118 A1 | 12/2009 | Fink et al. |
| 2009/0326970 A1 | 12/2009 | Estrada et al. |
| 2010/0014825 A1 | 1/2010 | Curtis et al. |
| 2010/0031333 A1 | 2/2010 | Mitchell et al. |
| 2010/0041475 A1 | 2/2010 | Zalewski et al. |
| 2010/0064008 A1 | 3/2010 | Yan et al. |
| 2010/0100849 A1 | 4/2010 | Fram |
| 2010/0150120 A1 | 6/2010 | Schlicht et al. |
| 2010/0154050 A1 | 6/2010 | Mukkara et al. |
| 2010/0167809 A1 | 7/2010 | Perlman et al. |
| 2010/0167816 A1 | 7/2010 | Perlman et al. |
| 2010/0169964 A1 | 7/2010 | Liu et al. |
| 2010/0174782 A1 | 7/2010 | Rose |
| 2010/0218104 A1 | 8/2010 | Lewis |
| 2010/0281095 A1 | 11/2010 | Wehner et al. |
| 2010/0281432 A1 | 11/2010 | Geisner et al. |
| 2011/0013087 A1 | 1/2011 | House et al. |
| 2011/0028194 A1 | 2/2011 | Tang et al. |
| 2011/0029932 A1 | 2/2011 | McKaskle et al. |
| 2011/0055222 A1 | 3/2011 | Choudur et al. |
| 2011/0059818 A1* | 3/2011 | Blais et al. ................. 473/471 |
| 2011/0093600 A1 | 4/2011 | Lee et al. |
| 2011/0105226 A1 | 5/2011 | Perlman |
| 2011/0111854 A1 | 5/2011 | Roberts et al. |
| 2011/0145880 A1 | 6/2011 | Wang |
| 2011/0151971 A1 | 6/2011 | Altshuler et al. |
| 2011/0161666 A1 | 6/2011 | Gladwin et al. |
| 2011/0202562 A1* | 8/2011 | Bloch et al. ................. 707/776 |
| 2011/0238618 A1 | 9/2011 | Valdiserri et al. |
| 2011/0263333 A1 | 10/2011 | Dokei et al. |
| 2011/0270924 A1 | 11/2011 | Johnsson et al. |
| 2011/0275431 A1* | 11/2011 | Hirzel et al. ................. 463/23 |
| 2011/0295666 A1* | 12/2011 | Musial et al. ................. 705/14.12 |
| 2012/0054002 A1 | 3/2012 | Rotbard et al. |
| 2012/0054685 A1 | 3/2012 | Su et al. |
| 2012/0130863 A1 | 5/2012 | Tedjamulia et al. |
| 2012/0142433 A1 | 6/2012 | Perlman et al. |
| 2012/0149476 A1 | 6/2012 | Perlman et al. |
| 2012/0151346 A1 | 6/2012 | McClements, IV |
| 2012/0151347 A1 | 6/2012 | McClements, IV |
| 2012/0173312 A1 | 7/2012 | Kern |
| 2012/0185066 A1 | 7/2012 | Kern et al. |
| 2012/0204107 A1 | 8/2012 | Salinas |
| 2012/0269394 A1 | 10/2012 | Kern et al. |
| 2012/0272139 A1 | 10/2012 | Kern et al. |
| 2012/0272187 A1 | 10/2012 | Su et al. |
| 2012/0272189 A1 | 10/2012 | Su et al. |
| 2012/0311624 A1 | 12/2012 | Oskolkov et al. |
| 2013/0031148 A1 | 1/2013 | Kern et al. |
| 2013/0031149 A1 | 1/2013 | Kern et al. |
| 2013/0067088 A1 | 3/2013 | Kern et al. |
| 2013/0067091 A1 | 3/2013 | Kern et al. |
| 2013/0084970 A1* | 4/2013 | Geisner et al. ................. 463/29 |
| 2014/0004951 A1 | 1/2014 | Kern et al. |
| 2014/0018157 A1 | 1/2014 | Kern et al. |
| 2014/0018165 A1 | 1/2014 | Kern et al. |

(56) References Cited

U.S. PATENT DOCUMENTS

| | | | |
|---|---|---|---|
| 2014/0025987 | A1 | 1/2014 | Kern et al. |
| 2014/0031121 | A1 | 1/2014 | Kern et al. |
| 2014/0038710 | A1 | 2/2014 | Rud et al. |

FOREIGN PATENT DOCUMENTS

| | | |
|---|---|---|
| CN | 102904922 | 1/2013 |
| CN | 103002001 | 3/2013 |
| CN | 103329153 | 9/2013 |
| DE | 102005034692 | 2/2007 |
| EP | 1879381 | 1/2008 |
| EP | 2426600 | 3/2012 |
| EP | 2477130 | 7/2012 |
| EP | 2552075 | 1/2013 |
| EP | 2558996 | 2/2013 |
| EP | 2568688 | 3/2013 |
| JP | 2004362149 | 12/2004 |
| WO | WO9712342 | 4/1997 |
| WO | WO2006076075 | 7/2006 |
| WO | W02012094269 | 7/2012 |

OTHER PUBLICATIONS

"Official Rules of Baseball—2011 Edition". Major League Baseball. Feb. 16, 2011. Retrieved from the Internet. Retrieved Jun. 1, 2013. <URL:http://web.archive.org/web/20120112040330/http://mlb.mlb.com/mlb/official_info/official_rules/foreword.jsp>.*
Bloviator. America's Army Training Guide. www.gamefaqs.com. Online. Mar. 24, 2008. Accessed via the Internet. Accessed Sep. 13, 2013.<URL: http://www.gamefaqs.com/pc/561551-americas-army/faqs/45333>.*
Abd El-Sattar. A Novel Interactive Computer-Based Game Framework: From Design to Implementation. 2008 International Conference Visualisation [Online] 2008, pp. 123-128.
Blevins. Neverwinter Nights—PC Review at IGN—p. 2. http://pc.ign.com/articles/363/363038p2.html (accessed Aug. 12, 2011).
Haynes. Dead Space Review—Xbox 360 Review at IGN—pp. 2 & 3. http://xbox360.ign.com/articles/918/918892p2.html & http://xbox360.ign.com/articles/918/918892p3.html (accessed Aug. 12, 2011).
Hernandez et al. WeSketch: A 3D Real Time Collaborative Virtual Environment that Improves the GUI Sketching Task. 2011 Eighth International Conference on Information Technology: New Generations [Online] 2011.
Raskin. Graph Plus. PC Magazine [Online] Oct. 17, 1989. V8, N17, p. 102(3).
Rowe et al. A Framework for Narrative Adaptation in Interactive Story-Based Learning Environments. Proceedings of the Intelligent Narrative Technologies III Workshop [Online] 2010.
Ludwig et al., "XEP-0166: Jingle," XMPP Standards Foundation. pp. 1-53. Dec. 23, 2009.
Rosenberg, "Interactive Connectivity Establishment (ICE): A Protocol for Network Address Translator (NAT) Traversal for Offer/Answer Protocols," Internet Engineering Task Force (IETF). pp. 1-117, Apr. 2010.
Zhou et al., "A Method of View-Frustum Culling with OBB Based on Octree," IET Conference on Wireless, Mobile and Sensor Networks 2007, pp. 680-682, Jan. 1, 2007. XP55023509.
World of Warcraft Gold, Anything About WOW, Apr. 23, 2007. retrieved from the internet: http://wowgolds.wordpress. com/2007/04/23/how-to-take-and-make-screenshots/ (accessed on Mar. 30, 2012) XP002672710.
Extended European Search Report with mail date of Mar. 30, 2012, re European Application No. 12151200.8 filed Jan. 16, 2012.
"Algemagorgic Non-Modal Context Menu," CodeGuru, May 22, 2004. retrieved from the internet: http://forums.codeguru.com/showthread.php?t=295801 (accessed on Apr. 27, 2012) XP002675225.
"Context Menu," Wikipedi, the free encyclopedia, Jun. 16, 2010. retrieved from the internet: http://en.wikipedia.org/w/index.php?title=Context_menu&oldid=368337587 (accessed on May 3, 2012) XP002675226.
"Maptool Concepts: The Next UI, Look, and Feel," RPTools.net, Feb. 2010. retrieved from the internet: http://forums.rptools.net/viewtopic.php?f=7&t=13178
&sid=107ad2f90d833d6b5669fbeO3587b091&start=45 (accessed May 3, 2012) XP002675227.
"Pie Menu," Wikipedia, the free encyclopedia, Jul. 5, 2010. retrieved from the internet: http://en.wikipedia.org/w/index.php?title=Pie_menu&oldid=371797903 (accessed May 3, 2012) XP002675228.
"Modal Window," Wikipedia, the free encyclopedia, Aug. 18, 2010. retrieved from the internet: http://en.wikipedia.org/w/index.php?title=Modal_window&oldid=379626221 (accesed on May 3, 2012) XP002675229.
Extended European Search Report with mail date of May 4, 2012, re Europren Application No. 11006996.0 filed Aug. 26, 2011.
"CPUsage wants to harness idle computer power for others to use" written by O.K. Row, available on or before, Jul. 2012 and retrieved from URL <http://www.oregonlive.com/small-business/index.ssf/2012/07/cpusavage_wants_to_harness_idle.html>, 3 pages.
"CPUsage: Let Your PC Earn Money for You" written by Lambert Varias, available on or before Aug. 26, 2011 and retrieved from URL <http://technabob.com/blog/2011/08/26/cpusage-make-money-with-your-pc/>, 3 pages.
"Need cash? Forget plasma, and donate CPU time instead" written by Stacey Higginbotham, available on or before Jul. 11, 2011 and retrieved from URL <http://gigacom.com/cloud/need-cash-forget-plasma-and-donate-cpu-time-instead/>.
"Info on Points and Redemption" written by Jeff Martens, available on or before Jul. 20, 2011 and retrieved from URL<http://www.cpusage.com/blog/computer-owners/info-on-points-and-redemption/>, 1 page.
BlamDarot, "Achievement Screenshotter", World of Warcraft Mod, Created Jul. 3, 2009, Last Updated Nov. 4, 2010, description accessed at http://www.curseforge.com/addons/achievement-screenshotter on Feb. 15, 2013.
Rytch, "Game-like environments for Nuclear engineering education using GECK", 1st International Nuclear & Renewable Energy Conference (INREC), pp. 1-5, IEEE, Mar. 2010.
Extended European Search Report with mail date of Dec. 3, 2012, re European Application No. 12170191.6 filed May 31, 2012.
Zhang, J. et al "WindTalker: A P2P-Based Low-Latency Anonymous Communication Network," IEICE Transactions on Communications, Communications Society, Tokyo, JP, vol. E92B, No. 10, Oct. 1, 2009, pp. 3183-3194.
Extended European Search Report with mail date of Jan. 8, 2013, re European Application No. 12170200.5 filed May 31, 2012.
International Search Report mailed Feb. 21, 2013 in application No. PCT/US2012/20007, filed Jan. 12, 2012.
Final, Jun. 24, 2013, U.S. Appl. No. 12/869,615, filed Aug. 26, 2010.
Final, Apr. 29, 2013, U.S. Appl. No. 13/008,854, filed Jan. 18, 2011.
Allowance, Jul. 5, 2013, U.S. Appl. No. 13/008,855, filed Jan. 19, 2011.
Final, May 30, 2013, U.S. Appl. No. 13/228,285, filed Sep. 8, 2011.
Non-Final, Jun. 5, 2013, U.S. Appl. No. 13/191,321, filed Jul. 26, 2011
Final, Jun. 24, 2013, U.S. Appl. No. 13/538,674, filed Jun. 29, 2012.
Final, Jun. 18, 2013, U.S. Appl. No. 13/536,941, filed Jun. 28, 2012.
Final, Jun. 24, 2013, U.S. Appl. No. 13/536,943, filed Jun. 28, 2012.
Advisory, May 8, 2013, U.S. Appl. No. 13/342,185, filed Jan. 2, 2012.
Final, May 1, 2013, U.S. Appl. No. 13/536,965, filed Jun. 28, 2012.
Advisory, May 14, 2013, U.S. Appl. No. 13/467,809, filed May 9, 2012.
Allowance, Jun. 20, 2013, U.S. Appl. No. 13/467,809, filed May 9, 2012.
Non-Final, Apr. 22, 2013, U.S. Appl. No. 13/467,867, filed May 9, 2012.
Final, Apr. 18, 2013, U.S. Appl. No. 13/558,158, filed Jul. 5, 2012.
Advisory, Jul. 29, 2013, U.S. Appl. No. 13/558,158, filed Jul. 5, 2012.
Final, Apr. 25, 2013, U.S. Appl. No. 13/549,375, filed Jul. 13, 2012.

(56) References Cited

OTHER PUBLICATIONS

Advisory, Jul. 11, 2013, U.S. Appl. No. 13/549,375, filed Jul. 13, 2012.
Final, Jul. 17, 2013, U.S. Appl. No. 13/538,757, filed Jun. 29, 2012.
Non-Final, Jul. 17, 2013, U.S. Appl. No. 13/549,350, filed Jul. 13, 2012.
"Neverwinter Nights Platinum". Game Manual. Copyright 2004, Atari Interactive, Inc. 114 pages.
"Horse menu". Neverwinter Nights Wiki page. Retrieved Jun. 20, 2013 from URL <Http://nwnwikia.com/wiki/Horse_menu>. 2 pages.
"Counter Strike Manual" published on or before May 15, 2006, and retrieved Jun. 13, 2013 from URL <http://web.archive.org/web/20060515161034/http://voidclan.tripod.com/csmanual.htm>, 17 pages.
"Spectator FAQ" published on or before Nov. 11, 2011 and retrieved from URL <http://web.archive.org/web/20111110125011/http://na.leagueoflegends.com/spectator-faq>, 4 pages.
"Killcam Description for Call of Duty" published on or before Nov. 11, 2011 and retrieved from URL <http://web.archive.org/web20111126172904/http/callofduty.wikia.com/wiki/Kilcam>, 7 pages.
"Counter-Strike" game description published on or before Nov. 21, 2010 and retrieved from URL <http://web.archive.org/web/20101121144545/http://en.wikipedia.org/wiki/Counter-Strike>, 6 pages.
Murph, Darren. "Editorial: ESPN bypasses corporate red tape with iPad and Xbox 360, wannabe innovators should take note" Jun. 12, 2010. <http://www.engadget.com/2010/06/12/editorial-espn-bypasses-corporate-red-tape-with-ipad-and-xbox-3/>.
Point-HD Telestrator with Ipad. Retreived Jul. 12, 2013, <http://www.hdtelestrators.com/Ipad%20Telestrator.html>.
European Patent Office First Exam Report mailed Mar. 4, 2013 in application No. 11006996.0, filed Aug. 26, 2011.
Intention to Grant dated Feb. 14, 2014 in Application No. 12170200.5, filed May 31, 2012.
Baset et al. "Reliability and Relay Selection in Peer to Peer Communication System", Dept. of Comp. Sci. Columbia University, NY, USA.
Allowance, Mar. 10, 2014, U.S. Appl. No. 13/228,285, filed Sep. 8, 2011.
Final, Sep. 30, 2013, U.S. Appl. No. 13/191,321, filed Jul. 26, 2011.
Final, Sep. 30, 2013, U.S. Appl. No. 13/467,867, filed May 9, 2012.
Advisory, Oct. 4, 2013, U.S. Appl. No. 13/538,757, filed Jun. 29, 2012.
Allownce, Feb. 6, 2014, U.S. Appl. No. 13/549,350, filed Jul. 13, 2012.
Non-Final, Feb. 27, 2014, U.S. Appl. No. 14/035,945, filed Sep. 24, 2013.

* cited by examiner

REFEREE MODE WITHIN GAMING ENVIRONMENTS

FIELD OF THE INVENTION

The present technology relates generally to videogames and gaming environments, and more specifically, but not by way of limitation, to videogames and gaming environments that allow for referee oversight within the gaming environment. In some instances, a referee may control or affect game play between participants, such as participants in a virtual sporting event.

BACKGROUND

Spectator modes within video games often allow for non-participating parties (e.g., spectators) to view game play or activities of active gaming participants (e.g., individuals playing the videogame). While these spectator modes allow spectators to view game play, they do not allow for spectators to actually control or influence the gaming experience of a game participant. Additionally, these spectator modes do not allow for a virtual referee to execute referee commands that control game play and/or interactions between active participants within a competition, such as a virtual sporting event.

SUMMARY OF THE INVENTION

According to some embodiments, the present technology may be directed to methods for providing referee control over game play within a gaming environment. The methods may comprise: (a) establishing a referee role that allows an end user to exert referee control of game play relative to a competition, within a gaming environment, between a plurality of participants; (b) establishing referee rights for the referee role, the referee rights being made available only to the end user upon which the referee role has been conferred; and (c) conferring the referee role upon the end user.

According to other embodiments, the present technology may be directed to methods for providing referee control within a gaming environment. These methods may comprise: (a) providing an end user with referee rights that allow the end user to referee a competition within a virtual gaming environment; and (b) executing referee commands received from the end user to affect the competition.

According to additional embodiments, the present technology may be directed to gaming systems that provides referee control of a gaming environment. These gaming systems may comprise: (a) a memory for storing executable instructions; and (b) a processor for executing the executable instructions, the executable instructions comprising: (i) a roll generator module that: (1) establishes a referee role that allows an end user to exert referee control of game play relative to a competition, within the gaming environment, between a plurality of participants; (2) assigns referee rights for the referee role, the referee rights being made available only to the end user upon which the referee role has been conferred; and (3) confers the referee role upon the end user.

DETAILED DESCRIPTION OF EXEMPLARY EMBODIMENTS

Figure 1:
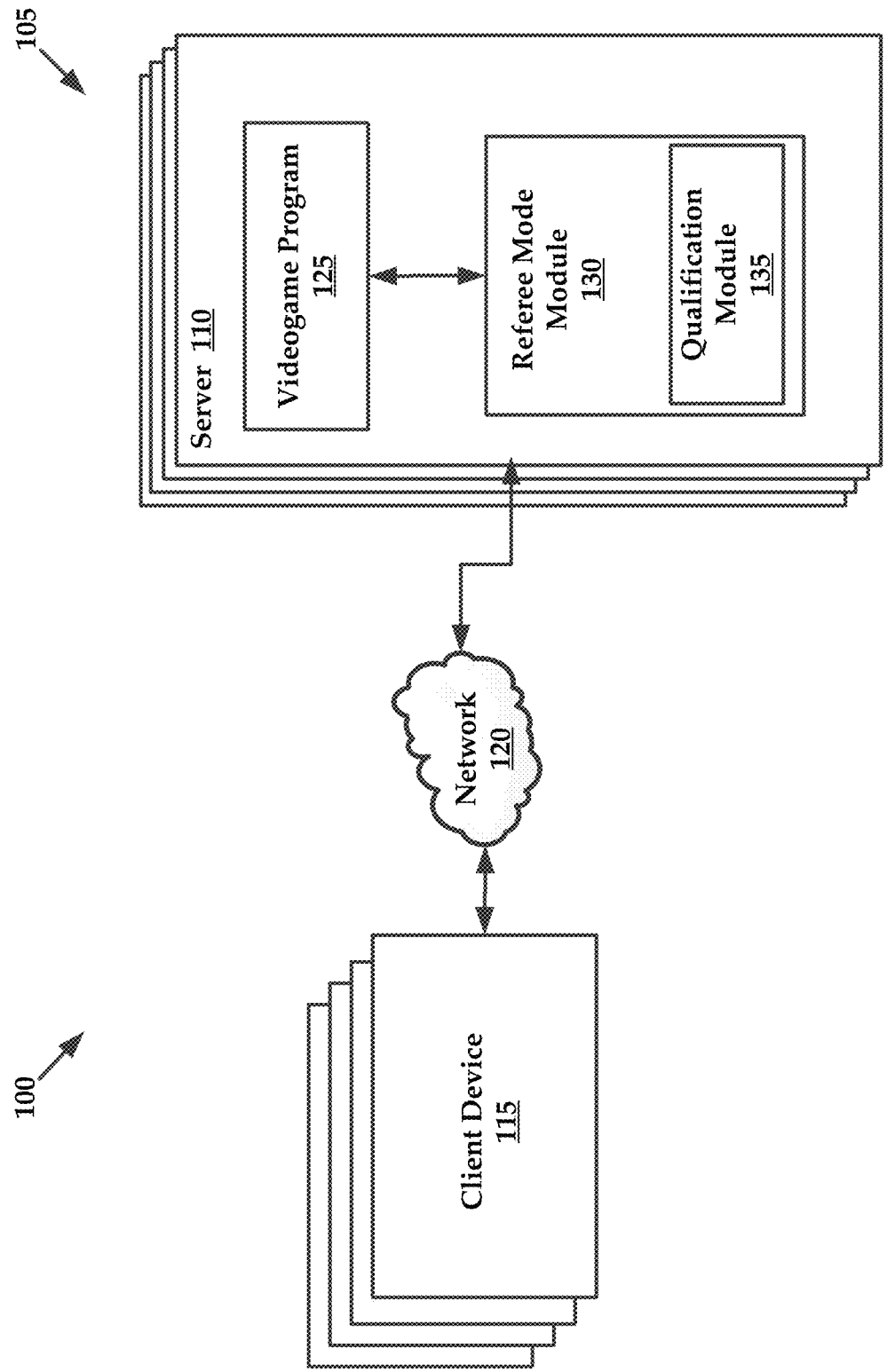
FIG. 1 illustrates an exemplary architecture for practicing aspects of the present technology.

While this technology is susceptible of embodiment in many different forms, there is shown in the drawings and will herein be described in detail several specific embodiments with the understanding that the present disclosure is to be considered as an exemplification of the principles of the technology and is not intended to limit the technology to the embodiments illustrated.

According to some embodiments, the present technology may be directed to systems and methods for providing referee control and/or oversight over game play within a gaming environment. More specifically, but not by way of limitation, the present technology may allow specified end users to act as virtual referees in a gaming environment, such as an virtual sports game. The present technology may assign a referee role to an end user. The referee role may comprise a plurality (or at least one) of referee rights that determine how the referee may affect game play. In broad terms, the referee may oversee, mediate, control, or otherwise affect the game play between participants in a competition, similarly to a referee in a physical sporting event.

In general, a referee may oversee a game being conducted within a gaming environment. The referee may be granted access to pause the game as necessary, keep time, add or subtract time, make calls such as fouls, eject participants from the game, rewind the game to certain player positions should a bug or error in the game make it impossible or unfair to continue, review past play upon pausing, switch between virtual cameras, or any other action of a virtual referee that would be known to one of ordinary skill in the art.

The rights attributed to the referee may depend, in part, upon the type of game being played. For example, the referee rights of a baseball umpire may be different from the rights of a referee in a basketball game. Various types of referees contemplated for use in accordance with the present technology may comprise, but are not limited to, umpires, judges, touch judge, arbiters, arbitrators, linesmen, commissaries, timekeepers, and so forth. Again, each of these different types of referees may be provisioned with unique (or sometimes similar) sets of rights and/or duties.

The present technology may provide referees with special commands that are only available to end users who have been commissioned as referees. That is, these commands are preferably unavailable to general participants in the gaming environment. These commands may be accessed through an intuitive interface or through user input received via a gaming system. For example, the referee may input referee commands via a control device of a gaming console.

The present technology may also vet or gate end users to for referee roles by, for example, requiring end users to pay a fee. In other instances, prospective referees may be required to complete and pass an online exam to establish a proficiency in the game. In other embodiments, prospective referees may be required to prove proficiency in the game by playing a minimum set of hours, attaining a certain minimum player ranking, achieving a skill set or accomplishment in the game, or other similar criterion that would be known to one of ordinary skill in the art.

In some instances, virtual sporting events may require multiple referees, and in some instances a virtual referee may be compensated to officiate various types of sporting events.

These and other advantages of the present technology will be discussed in greater detail herein.

FIG. 1 illustrates an exemplary architecture 100 for practicing aspects of the present technology. The architecture 100 is shown as including a networked gaming system 105 implemented within the context of a server 110 (shown within a plurality of web servers). The networked gaming system 105 may facilitate the operation of a videogame program 125 that generates a gaming environment, such as a virtual sporting competition.

An end user computing system 115 (shown within a plurality of end user computing systems) may be communicatively coupled to the server 110 via a network connection 120. It will be understood that the network connection 120 may include any private or public network such as the Internet. End user computing system 115 may comprise, for example, a personal computer or a gaming console.

When the end user computing system 115 is communicatively coupled to the server 110, a referee may oversee and/or control game play within the gaming environment generated by a videogame program 125 using their end user computing system 115. Likewise, participants may interact with the gaming environment using their own end user computing system 115.

In some embodiments, the networked gaming system 105 may be implemented as a cloud-based computing environment. In general, a cloud-based computing environment is a resource that combines the computational power of a large grouping of processors and/or that combines the storage capacity of a large grouping of computer memories or storage devices. For example, systems that provide a cloud resource may be utilized exclusively by their owners. These systems may be accessible to outside users who deploy applications within the computing infrastructure to obtain the benefit of large computational or storage resources.

The cloud may be formed, for example, by a network of web servers, with each web server (or at least a plurality thereof) providing processor and/or storage resources. These servers may manage workloads provided by multiple users (e.g., cloud resource consumers or other users). Typically, each user places workload demands upon the cloud that vary in real-time, sometimes dramatically. The nature and extent of these variations typically depend on the type of business associated with the user. With respect to the present disclosure, the workloads provided by the multiple users of the present technology would include game play in the networked gaming environment.

According to some embodiments, the networked gaming system 105 may be generally described as a particular purpose computing environment that includes executable instructions stored in memory. These instructions, when executed by the processor provide referee features within the gaming environment. More specifically, the networked gaming system 105 may execute the videogame program 125 to generate a gaming environment. The videogame program 125 may comprise one or more mechanisms for facilitating referee interaction with the gaming environment. According to some embodiments, the networked gaming system 105 establish a referee role that allows an end user to exert referee control of game play relative to a competition, within a gaming environment, between a plurality of participants. Additionally, the networked gaming system 105 may establish referee rights for the referee role. It will be understood that the referee rights may be made available only to the end user that the referee role has been conferred upon. Indeed, the networked gaming system 105 may confer the referee role upon the end user by way of a referee mode module, as will be discussed in greater detail below.

Stated otherwise, the networked gaming system 105 may provide for referee control within a gaming environment by providing an end user with one or more referee rights that allow the end user to referee a competition within a virtual gaming environment. The networked gaming system 105 receives these commands during game play and executes referee commands to affect the competition. In sum, each referee command may be associated with specific set of instructions for a videogame program 125 that are executed by the networked gaming system 105. In some embodiments, the videogame program 125 that facilitates a gaming environment may reside on the server 110.

Stated otherwise, the networked gaming system 105 may provide for referee control within a gaming environment by providing an end user with one or more referee rights that allow the end user to referee a competition within a virtual gaming environment. The network gaming system 105 receives these commands during game play and executes referee commands to affect the competition. In sum, each referee command may be associated with specific set of instructions for a videogame program 125 that are executed by the network gaming system 105. In some embodiments, the videogame program 125 that facilitates a gaming environment may reside on the server 110.

With regard to the videogame program 125, the videogame program 125 may comprise any type of videogame application/program/set of executable instructions, including but not limited to, a multiplayer networked videogame such as a sporting event, a MMORPG (massively multiplayer online role-playing game), a first-person shooter, a strategy game, role playing games, action games, arcade games, simulation games, and so forth. Other suitable types of videogames that would be known to one of ordinary skill in the art are also likewise contemplated for use in accordance with the present technology. Active participants (e.g., game players) may interact with the gaming environment that is generated by the videogame program 125. For example, participants in team sporting events, such as baseball, football, basketball, and so forth, may interact as a team. Individual competitors may also compete one on one with other participants in sporting event such as tennis, boxing, and so forth.

With regard to conventional videogames, the gaming experience for active participants is largely, if not entirely, predetermined by game designers and encoded into the videogame. Therefore, other than actions performed within the gaming environment by other active participants, the gaming experience of an active participant is preconfigured into the executable instructions for the videogame.

Advantageously, the present technology allows for referee interaction with the gaming environment. Referee interaction may comprise any of rule enforcement, time keeping, game play review, and so forth. Each of these broad types of referee interactions may be facilitated by executing individual referee commands during game play. For example, a rule enforcement command may include calling a foul. Again, the types of commands afforded to the referee may depend, in part, upon the type of video game being played. Moreover, each type of game may require various types of referees. For example, a virtual baseball game may require an umpire crew that comprises a home plate umpire, as well as first, second, and third base umpires. In some instances, the umpire crew may comprise right and left field umpires. Thus, a virtual baseball game may include a plurality of virtual referees.

In some instances, the videogame program 125 may comprise a referee mode module 130 and a qualification module 135. In other embodiments, the referee mode module 130 and the qualification module 135 may cooperate together as a standalone plug-in or module that is separate from the videogame program 125.

It is noteworthy that the server 110 may include additional modules, engines, or components, and still fall within the scope of the present technology. As used herein, the term "module" may also refer to any of an application-specific integrated circuit (ASIC), an electronic circuit, a processor (shared, dedicated, or group) that executes one or more software or firmware programs, a combinational logic circuit, and/or other suitable components that provide the described functionalities.

Prior to conferring a referee role to an end user, a plurality of various types of referee roles may be created. These referee roles may comprise various combinations of referee rights that define actions that may be executed within the gaming environment. Again, the referee rights that are included in the referee role may depend, at least in part, on the video game for which the referee role is being created. For example a home-base umpire referee role may include common referee rights that are within the purview of the home-base umpire, such as the ability to call balls, strikes, balks, and so forth. In other embodiment, a referee role may include a blending of roles of various referees. For example, the referee rights associated with a first and second base umpire may be combined together into a single referee role. In some instances, a rule set for a particular sporting event may be uploaded to the networked gaming system 105. The rule set may be analyzed and a referee role may be created from the rule set.

In some instances, the same referee role may be conferred on several people to create a pool of possible referees. Advantageously, if there are numerous end users that are qualified to act as referees, there is greater likelihood that there will be an end user available to referee a video game at any given time.

In some instances, end users may create unique referee roles that are tailored to a specific type of video game. For example, a referee role may be created for a gaming environment that is not typically associated with a referee, such as a first person shooter game. The referee for such a video game may enforce any types of rules established by the game participants.

In accordance with the present technology, referee roles may be created and/or uploaded to the networked gaming system 105 prior to conferring the referee roles on an end user.

End users may be vetted or qualified to be a referee before a referee role is conferred on the end user. According to some embodiments, the qualification module 135 may be executed facilitate the qualification of end users. By way of non-limiting example, qualifying an end user may require the end user to establish a level of proficiency with the video game for which they desire to referee. Establishing a level of proficiency may include the qualification module 135 determining that the end user has been an active participant in the video game for a predetermined amount of time. In other embodiments, establishing a level of proficiency may include the end user successfully completing an examination provided by the qualification module 135. An exemplary examination may include questions regarding the video game, providing suitable referee commands in response to a hypothetical gaming scenario, attaining a certain minimum player ranking in the video game, setting of achievement in the video game, and so forth. If required, once a level of proficiency has been established, the end user may be conferred a referee role by the referee mode module 130.

According to some embodiments, a referee role may be conferred on an end user according the payment of a fee. In some instances, the qualification module 135 may require that the end user establish proficiency in the video game as well as pay a fee.

The referee mode module 130 may establish referee records that are stored in a data store. These referee records may include referee qualifications (e.g., types of gaming events for which the end user is qualified to referee), a history of gaming events for the referee that may include, but is not limited to, referee commands executed during the event and so forth.

In some instances, the referee mode module 130 may track available referees that are online. The referee mode module 130 may automatically assign a referee to a gaming environment based upon need. In other embodiments, participants may select from a list of available referees that are currently online.

In accordance with the present disclosure, the referee mode module 130 may create a referee schedule for each referee that comprises a list of gaming events that have been assigned to the referee. The gaming events included in the list may be randomly selected or may include gaming events for which the referee has been requested by one or more participants. In creating the list of gaming events, the referee mode module 130 may evaluate qualifications for the referee as determined by the qualification module 135. Thus, even if a referee has been requested, if the referee is not qualified, the referee mode module 130 may prevent the end user from acting as referee in such instances.

During game play within a gaming environment, a referee may execute various referee commands that correspond to the referee rights included in the referee role. Referee commands may affect a flow of game play. For example, assume that the game play includes a basketball match. If the referee feels that a foul has been committed, the referee may execute a referee command that calls a foul on a particular participant. When the referee command is received by the networked gaming system 105, instructions within the videogame program 125 may be executed that cause various events relating to the calling of a foul on a particular player. For example, the foul may be assessed to a player, the fouled player may receive an opportunity to shoot free throws, and so forth. Thus, the receipt of a referee command by the networked gaming system 105 may cause a cascade of events within the gaming environment that affect the game play.

In some instances, the calling of a foul by the referee may execute a command that causes the game to be paused momentarily if the participant requests that the foul be reviewed.

Accordingly, in some instances, an action by a referee may be subject to review by one or more additional referees that are officiating the same gaming event. External referees may be consulted to review various referee commands. In other instances, a command of a referee may be subject to a crowd sourced review. That is, spectators or active participants may vote on their opinion of the action by the referee. If a sufficient amount of individuals vote to overturn the action, then the call of the referee may be reversed.

Statistics or metrics regarding challenges or other aspects of referee performance or behavior may be captured and stored in the referee record. These metrics may be used to determine the continued suitability of the end user to continue as a referee. For example, if the referee consistently receives negative feedback from participants or other referees, the end user may lose their referee status.

Similarly, because referees with high acumen and proficiency may be difficult to locate and retain, referees may be compensated for their time and effort. For example, an end user may be paid to act in the capacity of a referee. The referee may be compensated with currency, both real and/or virtual, a virtual reward, and so forth. Virtual rewards may comprise, for example, a coupon, a virtual trophy, an achievement, a weapon, inventory items for a video game, or any other virtual reward that would be known to one of ordinary skill in the art.

While the above described examples are instructive, one of ordinary skill in the art will readily appreciate that referee commands and corresponding actions that are executed within the video game program in response to such commands are limitless in nature and quantity. These commands and resulting actions may be tailored to specific video game programs by program authors. Although, common referee commands and corresponding actions will be apparent to those familiar with exemplary sports or other competitions for which virtual games are created.

Figure 2:
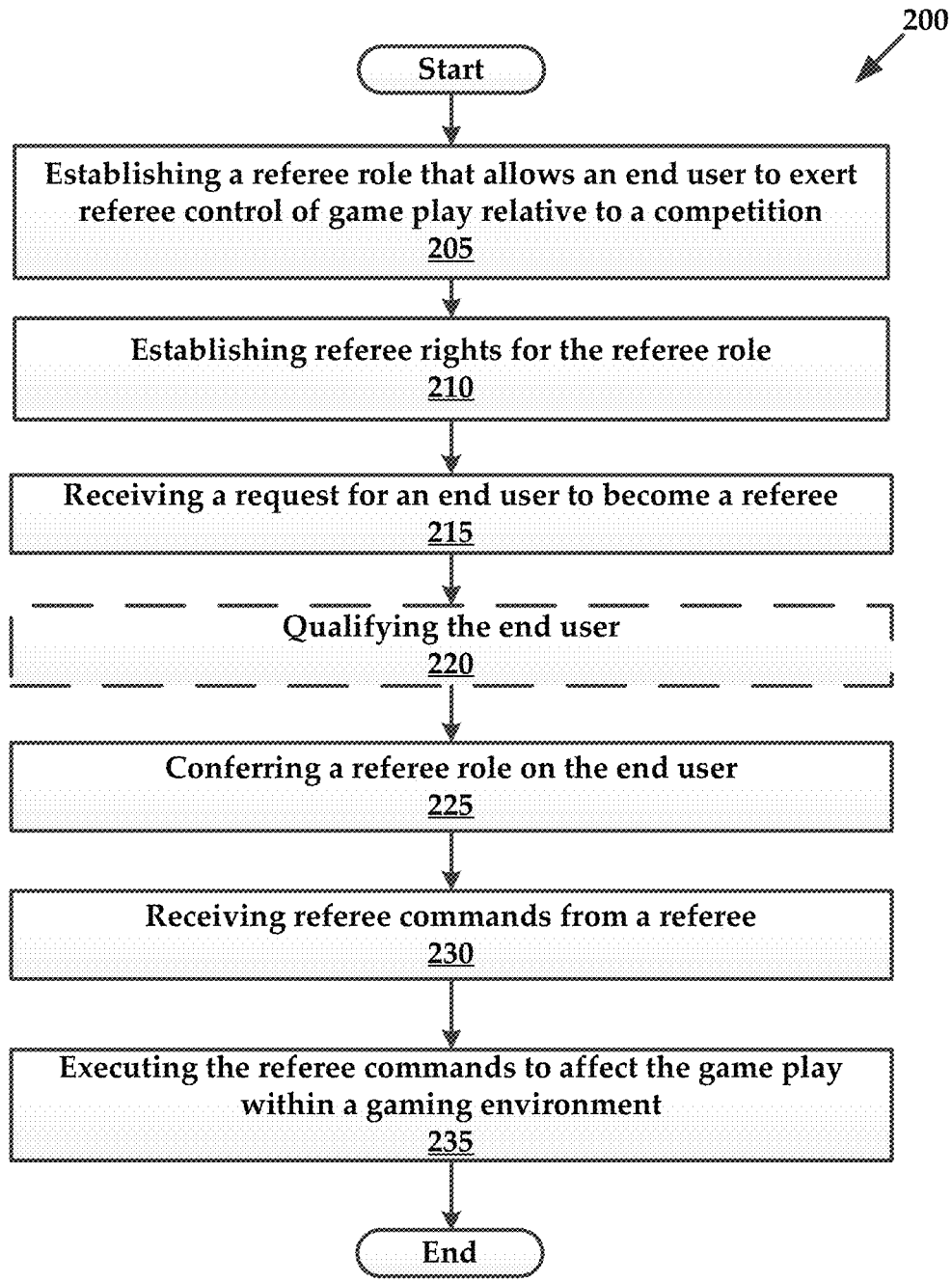
FIG. 2 is a flowchart of an exemplary method for providing referee control over game play within a gaming environment.

FIG. 2 is a flowchart of an exemplary method 200 for providing referee control over game play within a gaming environment. The method 200 may comprise the step 205 of establishing a referee role that allows an end user to exert referee control of game play relative to a competition, within a gaming environment, between a plurality of participants. In operation, many types of referee roles may be created based upon the nature of the video game for which the referee is needed. Additionally, a plurality of referee roles may be established for a plurality of different types of video games.

To create the referee role, the method may comprise the step 210 of establishing referee rights for the referee role. In some instances the referee rights may be made available only to the end user upon, which the referee role has been conferred. Again, in some instances the same referee role may be conferred on several people to create a pool of possible referees.

The method may also comprise a step 215 of receiving a request for an end user to become a referee. In other instances, this step may alternatively include the system actively soliciting end users to become referees.

Upon receipt of a request, the method 200 may comprise an optional step 220 of qualifying the end user. Again, end users may be vetted or qualified to be a referee before a referee role is conferred on the end user. By way of non-limiting example, qualifying an end user may require the end user to establish a level of proficiency with the video game for which they desire to referee. Establishing a level of proficiency may include determining if the end user has been an active participant in the video game for a predetermined amount of time. In other embodiments, establishing a level of proficiency may include the end user successfully completing an examination. An exemplary examination may include questions regarding the video game, providing suitable referee commands in response to a hypothetical gaming scenario, attaining a certain minimum player ranking in the video game, setting of achievement in the video game, and so forth.

The method 200 may also comprise the step 225 of conferring a referee role on the end user. During game play, the method 200 may then include a step 230 of receiving referee commands from a referee, along with a step 235 of executing the referee commands to affect the game play within a gaming environment. For example, a referee command may comprise ejecting a participant from game play due to unacceptable behavior. The networked gaming system may then cause the removal of the participant from the game play in accordance with the referee command. Thus, the referee command may create an effect within the gaming environment by causing the networked gaming system which provides the gaming environment to execute instructions that fulfill the referee command.

Figure 3:
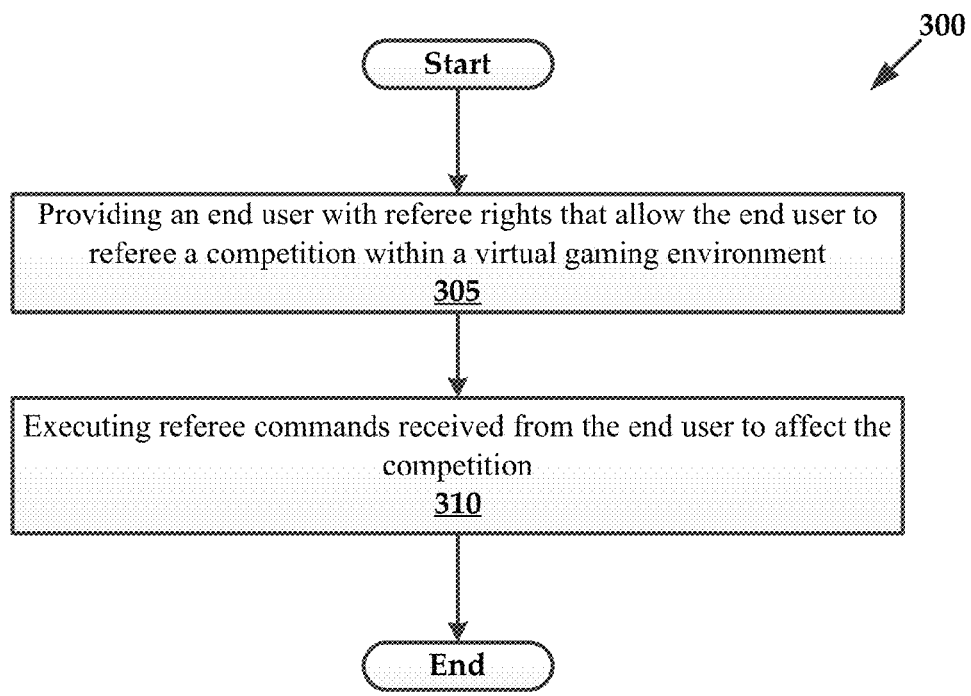
FIG. 3 is a flowchart of another exemplary method for providing referee control within a gaming environment.

FIG. 3 is flowchart of another exemplary method 300 for providing referee control within a gaming environment. The method 300 may comprise a step 305 of providing an end user with referee rights that allow the end user to referee a competition within a virtual gaming environment. During game play, the method may comprise a step 310 of executing referee commands received from the end user to affect the competition.

Figure 4:
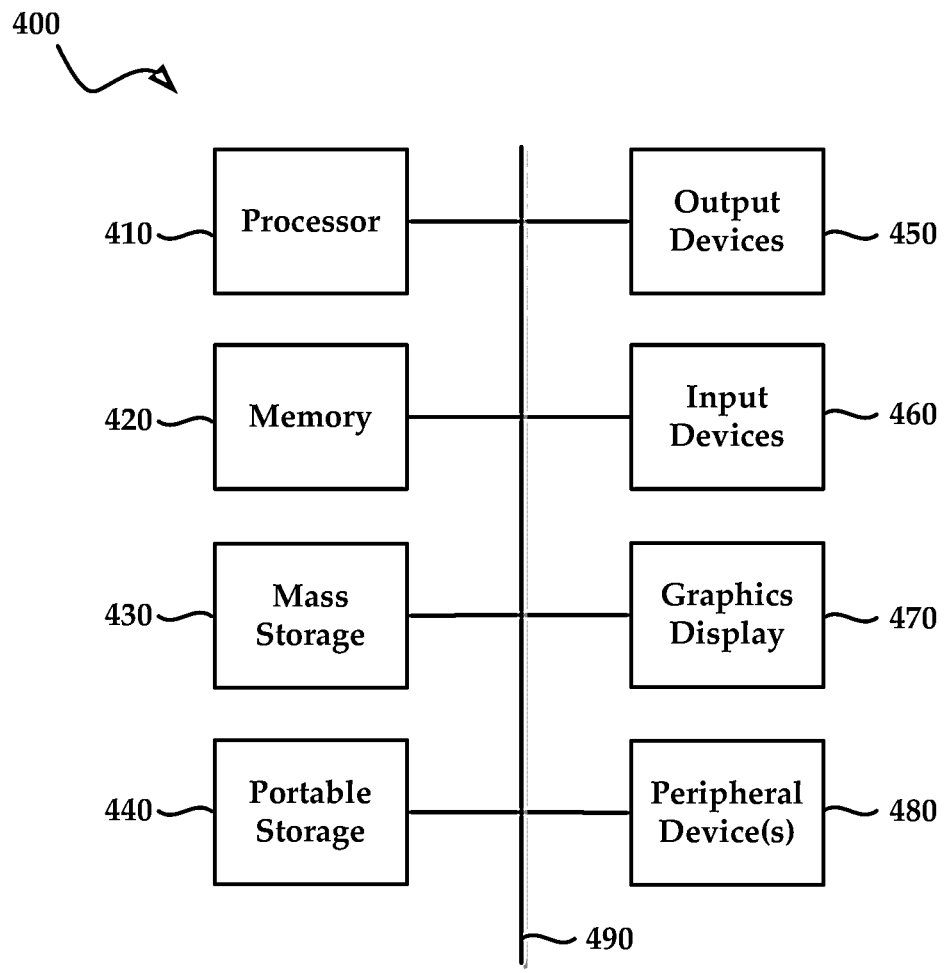
FIG. 4 is a block diagram of an exemplary computing system that may be utilized to practice aspects of the present disclosure.

FIG. 4 illustrates an exemplary computing system 400 that may be used to implement an embodiment of the present technology. Either of the end user computing system 115 and/or the server 110 may include one or more of the components of computing system 400. The computing system 400 of FIG. 4 includes one or more processors 410 and memory 420. Memory 420 stores, in part, instructions and data for execution by the one or more processors 410.

Memory 420 can store the executable code when the computing system 400 is in operation. The computing system 400 of FIG. 4 may further include a mass storage device 430, portable storage medium drive(s) 440, output devices 450, user input devices 460, a graphics display 470, and other peripheral device(s) 480.

The components shown in FIG. 4 are depicted as being connected via a single bus 490. The components may be connected through one or more data transport means. The one or more processor 410 and main a memory store 420 may be connected via a local microprocessor bus, and the mass storage device 430, peripheral device(s) 480, portable storage medium drive(s) 440, and graphics display 470 may be connected via one or more input/output (I/O) buses.

Mass storage device 430, which may be implemented with a magnetic disk drive or an optical disk drive, is a non-volatile storage device for storing data and instructions for use by processor 410. Mass storage device 430 can store the system software for implementing embodiments of the present technology for purposes of loading that software into memory 420.

Portable storage medium drive(s) 440 operate in conjunction with a portable non-volatile storage medium, such as a floppy disk, compact disk or digital video disc, to input and output data and code to and from the computing system 400 of FIG. 4. The system software for implementing embodiments of the present technology may be stored on such a portable medium and input to the computing system 400 via the portable storage medium drive(s) 440.

Input devices 460 provide a portion of a user interface. Input devices 460 may include an alphanumeric keypad, such as a keyboard, for inputting alphanumeric and other information, or a pointing device, such as a mouse, a trackball, stylus, or cursor direction keys. Additionally, the computing system 400 as shown in FIG. 4 includes output devices 450. Suitable output devices include speakers, printers, network interfaces, and monitors.

Graphics display 470 may include a liquid crystal display (LCD) or other suitable display device. Graphics display 470 receives textual and graphical information, and processes the information for output to the display device.

Peripheral device(s) 480 may include any type of computer support device to add additional functionality to the computing system. Peripheral device(s) 480 may include a modem or a router.

The components contained in the computing system 400 of FIG. 4 are those typically found in computing systems that may be suitable for use with embodiments of the present technology and are intended to represent a broad category of such computer components that are well known in the art. Thus, the computing system 400 of FIG. 4 can be a personal computer, hand held computing system, telephone, mobile computing system, workstation, server, minicomputer, mainframe computer, or any other computing system. The computer can also include different bus configurations, networked platforms, multi-processor platforms, etc. Various operating systems can be used including UNIX, Linux, Windows, Macintosh OS, Palm OS, and other suitable operating systems.

Some of the above-described functions may be composed of instructions that are stored on storage media (e.g., computer-readable medium). The instructions may be retrieved and executed by the processor. Some examples of storage media are memory devices, tapes, disks, and the like. The instructions are operational when executed by the processor to direct the processor to operate in accord with the technology. Those skilled in the art are familiar with instructions, processor(s), and storage media.

It is noteworthy that any hardware platform suitable for performing the processing described herein is suitable for use with the technology. The terms "computer-readable storage medium" and "computer-readable storage media" as used herein refer to any medium or media that participate in providing instructions to a CPU for execution. Such media can take many forms, including, but not limited to, non-volatile media, volatile media and transmission media. Non-volatile media include, for example, optical or magnetic disks, such as a fixed disk. Volatile media include dynamic memory, such as system RAM. Transmission media include coaxial cables, copper wire and fiber optics, among others, including the wires that comprise one embodiment of a bus. Transmission media can also take the form of acoustic or light waves, such as those generated during radio frequency (RF) and infrared (IR) data communications. Common forms of computer-readable media include, for example, a floppy disk, a flexible disk, a hard disk, magnetic tape, any other magnetic medium, a CD-ROM disk, digital video disk (DVD), any other optical medium, any other physical medium with patterns of marks or holes, a RAM, a PROM, an EPROM, an EEPROM, a FLASHEPROM, any other memory chip or data exchange adapter, a carrier wave, or any other medium from which a computer can read.

Various forms of computer-readable media may be involved in carrying one or more sequences of one or more instructions to a CPU for execution. A bus carries the data to system RAM, from which a CPU retrieves and executes the instructions. The instructions received by system RAM can optionally be stored on a fixed disk either before or after execution by a CPU.

While various embodiments have been described above, it should be understood that they have been presented by way of example only, and not limitation. The descriptions are not intended to limit the scope of the technology to the particular forms set forth herein. Thus, the breadth and scope of a preferred embodiment should not be limited by any of the above-described exemplary embodiments. It should be understood that the above description is illustrative and not restrictive. To the contrary, the present descriptions are intended to cover such alternatives, modifications, and equivalents as may be included within the spirit and scope of the technology as defined by the appended claims and otherwise appreciated by one of ordinary skill in the art. The scope of the technology should, therefore, be determined not with reference to the above description, but instead should be determined with reference to the appended claims along with their full scope of equivalents.

What is claimed is:

1. A method for providing referee control over game play within a gaming environment, the method comprising:
    establishing a referee role that allows an end user to exert referee control of game play relative to a competition, within the gaming environment, between a plurality of participants, the referee role established using a networked gaming system running on a server;
    establishing referee rights for the referee role using the networked gaming system, the referee rights being made available only to the end user upon which the referee role has been conferred;
    qualifying the end user for the referee role by requiring the end user to complete and pass an examination to establish proficiency in the game, the examination comprising questions regarding referee commands in response to a hypothetical gaming scenario; and
    conferring the referee role upon the end user using a referee mode module.

2. The method according to claim 1, further comprising selecting the end user for the referee role from a list of available referees currently online who have been required to establish a level of proficiency relative to the competition.

3. The method according to claim 1, further comprising qualifying the end user for the referee role by requiring the end user to pay a fee to become a referee.

4. The method according to claim 1, wherein the referee rights comprise commands that allow the end user in the referee role to enforce rules established by game participants.

5. The method according to claim 1, wherein the referee rights comprise commands that allow the end user in the referee role to disqualify any of the plurality of participants.

6. The method according to claim 1, wherein the referee rights comprise commands that allow the end user in the referee role to pause the game, control play of the game, review past play upon pausing the game, and replay at least a portion of the game play captured by a gaming system that provides the gaming environment.

7. The method according to claim 1, wherein if the gaming environment comprises a sporting event, the referee rights for the referee role allow the end user in the referee role to enforce rules for the sporting event.

8. The method according to claim 1, further comprising:
    receiving a referee command during game play from an end user device associated with a referee; and
    executing an action that affects the game play, the action corresponding to the referee command.

9. The method according to claim 1, wherein establishing a referee role includes receiving rules from end users and using the received rules for creating the referee role.

10. An online video gaming system that provides referee control of a gaming environment, the online video gaming system comprising:
    a memory for storing executable instructions; and
    a processor for executing the executable instructions, the executable instructions comprising:
        a referee mode module that:
            receives a rule set uploaded to the online video gaming system;
            analyzes the rule set;
            establishes, from the analysis of the rule set, a referee role that allows an end user to exert referee control of game play relative to a competition, within the gaming environment, between a plurality of participants;
        comprises a qualification module that qualifies the end user for the referee role by requiring the end user to complete and pass an examination to establish proficiency in the game, the examination comprising questions regarding referee commands in response to a hypothetical gaming scenario;

confers the referee role upon the end user; and assigns referee rights for the referee role, the referee rights being made available only to the end user upon which the referee role has been conferred.

11. The system according to claim 10, wherein the qualification module further qualifies the end user for the referee role by requiring the end user to establish a minimum level of player ranking relative to the competition.

12. The system according to claim 10, wherein the qualification module further qualifies the end user for the referee role by requiring the end user to complete an examination, the examination comprising determining suitability of referee commands provided by the end user in response to a hypothetical video gaming scenario.

13. The system according to claim 10, wherein the qualification module further qualifies the end user for the referee role by requiring the end user to pay a fee to become a referee.

14. The system according to claim 10, wherein the referee rights comprise commands that allow the end user in the referee role to enforce rules relative to the competition.

15. The system according to claim 10, wherein the referee rights comprise commands that allow the end user in the referee role to disqualify any of the plurality of participants.

16. The system according to claim 10, wherein the referee rights comprise commands that allow the end user in the referee role to rewind at least a portion of the game play captured by the online video gaming system to previous player positions as a result of an error in the online video gaming system and replay the online video game from the previous player positions.

17. The system according to claim 10, wherein if the gaming environment comprises a sporting event, metrics regarding challenges of the end user in the referee role while enforcing rules for the sporting event are captured and stored in a referee record.

18. A method for providing referee control within a gaming environment, the method comprising:

qualifying an end user for a referee role by requiring the end user to complete and pass an examination to establish proficiency in a game, the examination comprising questions regarding referee commands in response to a hypothetical gaming scenario;

providing the qualified end user with referee rights that allow the end user to referee a competition within a virtual gaming environment;

executing referee commands received from the end user to affect the competition; and storing a history of referee commands executed during gaming events in a data store.

19. The method according to claim 18, further comprising receiving votes from active participants regarding an executed referee command and overturning the executed referee command based on the received votes.

* * * * *